United States Patent [19]
Tamburino et al.

[11] Patent Number: 5,162,861
[45] Date of Patent: Nov. 10, 1992

[54] LASER IMAGING AND RANGING SYSTEM USING ONE CAMERA

[76] Inventors: Louis A. Tamburino, 2930 E. Stroop Rd., Kettering, Ohio 45440; John Taboada, 12530 Elm Country, San Antonio, Tex. 78230

[21] Appl. No.: 677,896

[22] Filed: Apr. 1, 1991

[51] Int. Cl.⁵ .............................................. G01C 3/08
[52] U.S. Cl. ......................................... 356/5; 356/2; 356/152; 358/125
[58] Field of Search .................... 356/1, 2, 5, 141, 152; 358/108, 125

[56] References Cited

U.S. PATENT DOCUMENTS

| | | | |
|---|---|---|---|
| 3,409,369 | 11/1968 | Bickel | 88/1 |
| 3,465,156 | 9/1969 | Peters | 250/199 |
| 3,504,182 | 3/1970 | Pizzurro et al. | 250/199 |
| 4,515,472 | 5/1985 | Welch | 356/5 |
| 4,687,326 | 8/1987 | Corby Jr. | 356/5 |
| 4,967,270 | 10/1990 | Ulich et al. | 356/5 X |

OTHER PUBLICATIONS

Treedem. Ima. Using Single Laser Pulse Knight Klick, Howard A. M. Beckman Telo Corp. Laser Radar 1V (1989).
Design Hardbook, Three Dimen. Machine Vision, Dr. Leonard H. Bieman; May 1988.
Precision Pulse Generator Dig. Delay Gen. Stan. Research Syst. Inc.

Primary Examiner—Mark Hellner
Attorney, Agent, or Firm—Gerald B. Hollins; Donald J. Singer

[57] ABSTRACT

A pulsed laser illumination based one camera ranging and imaging system which requires only a single axis optical aperture and is therefore suited to use on aircraft and other space and configuration limited apparatus is disclosed. The invention uses intensity coded partial images of the distant target in a single camera with the partial images being obtained by a distance segregating optical modulation arrangement which separates pixel portions according to their arrival time and thereby the distance of travel from the target. The described system uses pixel by pixel processing of the segregated images as accomplished in an image array processor, for example.

19 Claims, 3 Drawing Sheets

FRAME A IMAGE

FRAME B IMAGE

LASER IMAGING AND RANGING SYSTEM USING ONE CAMERA

RIGHTS OF THE GOVERNMENT

The invention described herein may be manufactured and used by or for the Government of the United States for all governmental purposes without the payment of any royalty.

REFERENCE TO RELATED APPLICATION

This application is somewhat related to application Ser. No. 07/677,878 (AF Inv 19087) titled LASER IMAGING AND RANGING SYSTEM USING TWO CAMERAS that is filed in the name of the same inventors and filed of even date herewith.

BACKGROUND OF THE INVENTION

This invention relates to the field of optical range mapping of the nontriangulation type.

In activities as diverse as midair refueling, automatic target recognition, robotic vision, space vehicle docking, industrial inspection and customized equipment design, for example, there is need for precise mappings of range measurements. Often such measurements are over distances in excess of that accommodated by conventional graduated tension member measurement or impractical of such measurement. The term mapping as used here includes range determination for a multiplicity of different points located on the distal target shape of the target object.

In the past such techniques as triangulation using optical images taken from two different viewpoints, or the time for energy propagation to and from a distal target object have been employed for accomplishing range measurements. In many range finding systems, however, there is need for speed and accuracy and operational simplicity in determining the range map of a distal target such as preclude the use of previous measurement techniques. The triangulation range mapper, for example, as is often used in cameras and in artillery measurement periscopes is slow and often cumbersome in range accomplishment and somewhat difficult to perform as a computer or electronics system operating function. Since triangulation usually involves two superimposed or split field images for indication it often requires the conclusion of a human interpreter to reliably complete the measurement. Another example of triangulation impracticability is to be found in the field of airborne weaponry wherein it is often difficult to locate a plurality of optical apertures at meaningful distances on an airframe,—and yet there is present a strong need for quick and accurate determination of range maps for use in rocketry and other weapons related functions.

Since many current uses for a range mapping system impose requirements of nonhuman interpretation, small physical size, the use of a single optical aperture, and accuracy in both the near field and far field environment, there is need for an improved laser imaging ranging system in the art. The system described herein responds to this need and can be conveniently referred-to by way of the acronym LIMAR/1 which is derived from the first or first and second letters of the words in the invention name.

The patent art includes several examples of range finding systems including laser operated systems which are of interest with respect to the present invention. Included in these patent examples is U.S. Pat. No. 3,409,369, issued to G. W. Bickel and concerning a laser radar system which operates on the Doppler velocity measuring principle using two different transmitted frequencies in order to obtain a conveniently low difference frequency. Since the Bickel apparatus is principally concerned with the Doppler operating concept and target velocity measurement, the present invention is readily distinguished therefrom.

Also included in these prior patents is U.S. Pat. No. 3,465,156 issued to C. J. Peters and concerned with a laser communication system which employs a narrow band noise cancellation technique with the transmitted laser beam divided into two different paths. The Peters received laser light is also split into two beams one of which contains the video signal modulation and both of which contain noise components. Since the Peters apparatus is concerned with a laser communication system, the present invention range finding concepts are readily distinguished.

Also included in these prior patents is U.S. Pat. No. 3,504,182 issued to V. F. Piezzurro et al and also concerned with an optical communication system. In the Piezzurro et al communication system scanning by the beam emitted from one station is used to "acquire" the scanning pattern of a second station in order that the two stations can lock on and be ready to transmit and receive information. Distinctions between the present invention and communications system of Piezzurro et al are readily apparent.

Also included in this art is the U.S. Pat. No. 4,515,472 of A. B. Welch which is concerned with an agile receiver for a scanning laser radar system. The Welch apparatus uses a receiver frequency adjustment arrangement in order to rapidly acquire, recognize, track and perform simultaneous guidance functions for a multiplicity of weapons against a multiplicity of targets. In view of this purpose and functioning of the Welch apparatus, distinction from the present invention range mapping system is easily discerned.

SUMMARY OF THE INVENTION

In the present invention short pulsed laser radiation is projected onto a target object and the returning scattered light is captured by an optical system which partitions the returning and range encoded light signals into one of two operating frames of a single optical to electrical transducer camera. During a succeeding frame of the camera system a returning signal is optically modulated with a time dependent range indicating signal which enables decoding of the pixel intensity in the two camera frames to derive a range indication. The decoding may employ a conventional image processing system. The invention provides a numerical map of range indication that is registered with an optical image of the system output.

An object of the present invention is therefore to provide a single optical aperture laser range measuring system.

Another object of the invention is to provide a range measuring arrangement in which the range indicating information is coded into the form of pixel intensity in an optical image.

It is another object of the invention to provide a range mapping system in which an image of the range mapped target is also available.

Another object of the invention is to provide a range mapping system in which the intensity coded range information of two partial images is also usable for reconstructing a full image of the range mapped target.

It is another object of the invention to provide a range measuring system in which range communicating signals are preserved in the form of pixel intensity ratio modulation without reliance on absolute values of pixel intensity.

It is another object of the invention to provide a range map indicating system in which two single axis views of the range mapped target are utilized.

It is another object of the invention to provide for the recording of two-dimensional and three-dimensional image information in a fully compatible format.

It is another object of the invention to provide a one camera, one aperture range mapping system.

Another object of the invention is to provide a single apertured range mapping system in which the range map indicating data is stored in the form of two images of the range mapped target.

It is another object of the invention to provide a range mapping system which is especially convenient for use on aerospace and autonomous vehicles.

It is another object of the invention to provide a time of propagation range measurement system which employs simplified electro-optical switching.

It is another object of the invention to provide a range mapping system in which noise reduction through the use of signal time averaging may be accomplished.

It is another object of the invention to provide a time of propagation range mapping system which can be accomplished without a streak camera.

It is another object of the invention to provide a range mapping system which can be accomplished without the use of moving parts.

These and other objects of the invention are achieved by laser imaging and ranging apparatus having pulsed laser optical means including a single camera member and a first operating cycle portion therein for generating a full image first pixel intensity array representation of a distal target; first electrical memory means for storing said full image first representation in image pixel organized array; modulated optical path means including a second operating cycle portion in said camera member for generating a partial image second pixel intensity array representation of said target; said partial image second representation including a range proportioned pixel intensity modulation relationship with respect to a full image representation of said target; second electrical memory means for storing said partial image second representation in image pixel organized array; mathematical algorithm electrical circuit means for computing the range coded intensity ratio of corresponding image pixels in said first and second electrical memory means.

Additional objects and features of the invention will be understood from the following description and claims and the accompanying drawings.

DETAILED DESCRIPTION

Figure 1:
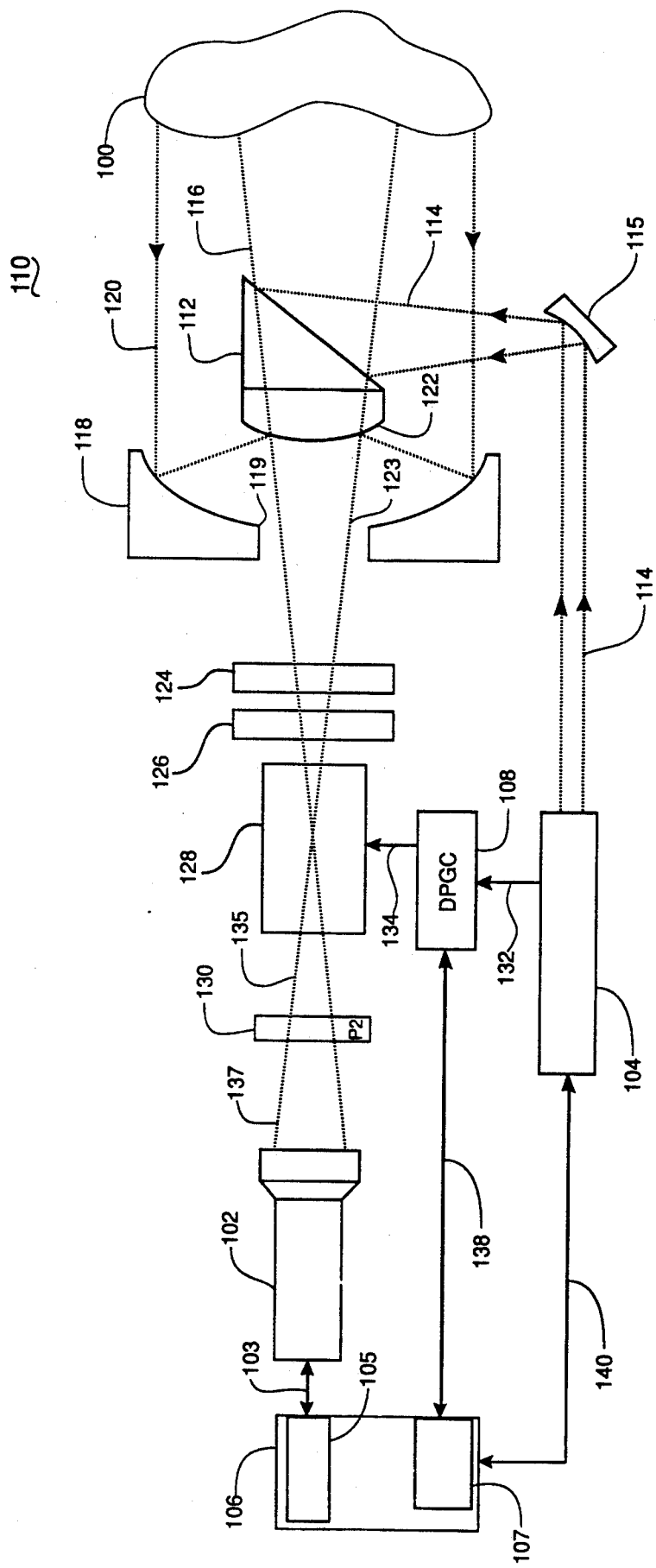
FIG. 1 shows a block diagram of a range mapping system in accordance with the invention.

FIG. 1 in the drawings shows an embodiment of a laser imaging and ranging system using a single video camera that is in accordance with the present invention. In the FIG. 1 system a distal target 100 is illuminated by light from a laser 104 by way of an optical system that is generally indicated at 110. The returning reflected light from the target 100 is ultimately received in a single video camera 102 in FIG. 1 where it is transduced to an electrical signal and conducted on the path 103 to a digital image processing system 106.

In the FIG. 1 optical system, coherent light emission from the laser 104 is communicated along the path 114 by way of the mirrors 112 and 115 to the path 116 which terminates in the distal target 100. Light reflected from the target 100 is communicated by the path 120 to the concave and convex mirrors 118 and 122 for reflection through the mirror aperture 119 to the optical filter elements 124 and 126 and thence to the electro-optical polarization modulating element 128. The filter 124 in this optical system is of the optical bandpass type and restricts the light transmitted from the convex mirror 122, that is light along the path 123, to a narrow spectral band which includes the wavelength of the laser 104. The filter element 126 additionally restricts the light along the path 133 to components which are polarized in a single plane—such as the plane perpendicular to the FIG. 1 drawing, for example. The electro-optic polarization modulation element 128 accomplishes by means of electro-optics effects, such as the Pockels or Kerr effects, a controllable degree of polarization rotation in response to electrical signals received along the path 134.

Light from the electro-optic polarization modulating element array 128 emerges along the path 135 and passes through the polarizer-filter 130 where attenuation in accordance with the rotated position of the beam polarization occurs. This polarization rotated and attenuated light energy of the path 137 is then received in an optical to electrical transducer element or retina portion of the video camera 102 where conversion to an electrical signal transmitted on the path 103 occurs.

As explained in greater detail below herein, the camera 102 is preferably operated in a two frame cycle wherein a first frame receives light that has been accorded one direction of polarization rotation in the electro-optical polarization modulating element 128 and light received during the second frame of this cycle has been dynamically modulated by polarization rotation. The electrical signals resulting from these two frames of polarized light signals from the target 100 are received in the digital image processing system 106 wherein, as described below, a frame grabbing sequence of pixel by pixel analysis is accomplished. This analysis includes ratio comparison of pixel intensities in corresponding pixels of the two frames.

The electrical signal which controls the degree of polarization change or the degree of modulation achieved in the electro-optical polarization modulating element 128 originates in the driver signal generator circuit 108 in response to a trigger signal command received along the path 132 from the laser system 104.

These control commands act to adjust the output characteristics of the driver signal generator 108 signals along the path 134. Additional details of individual portions of the driver signal generator circuits are shown and described herein. In some arrangements of the FIG. 1 system a signal acknowledging to the computer 106 that certain events in the driver signal generator circuit's operation have occurred may be desirable; such a signal may be communicated back along the bidirectional path 138 from the driver signal generator circuit to the interface board 107.

The laser 104 in the FIG. 1 system is selected to have a pulse duration of shorter time than the time of propagation across a typical dimension of target geometry. For objects of the size of an automobile for example the laser 104 is preferably of the mode-locked Q-switched and cavity dumped yttrium-aluminum garnet "YAG" type which is operated in the frequency doubling mode to produce a 532 nanometer wavelength sequence of output pulses, pulses which may be in the order of 50 picoseconds in pulse length. Such lasers are available from Quantel International Company as the model YG 501C-10 laser. The output energy from the laser 104 is communicated along the paths 114 and 116 by way of mirrors 115 and 112 to the distal target 100 that is to be range mapped.

Optical energy returning from the distal target 100 is of greater cross section as a result of scatter as indicated by the path 120 in FIG. 1. In addition to this divergence, the signals along the path 120 are also displaced in time in accordance with the physical features and dimension of the target 100 and in keeping with the principle that signals returning from nearer portions of the target 100 involve a shorter distance of travel both to and from the target and thereby are received earlier in time than are the signals returning from more distant portions of the target 100.

Light along the path 120 from the distal target 100 is concentrated by the concave mirror 118 and imaged by the action of the convex mirror 122 through the intermediate elements onto the receiving plane or retina of the video camera 102 system shown in FIG. 1. A camera such as the Xybion type ISS 205 R3 may be used in the FIG. 1 system. Within the image processing system 106 electrical signals originating in the video camera of FIG. 1 may be received by an image processing circuit array 105 such as is provided by the imaging Technology model FG-100-AT circuit board or ITEX Corporation Type 100 board. Such Image Processing circuit boards may be embedded in a microcomputer 106 (which may be of a type such as the IBM-AT personal computer) to receive the camera signals in FIG. 1. The computer 106 also includes the control interface 107 which may be an IBM model DACA interface control circuit board.

The optical bandpass filter 124 in FIG. 1, as indicated above, preferably is arranged to favor the optical spectrum region in which the laser 104 operates, that is, the spectral region adjacent a wavelength of 532 nanometers; this filter may be embodied as a type 03 IFS 008 filter which is available from Milles Griot Corporation. The polarizing filter 126 in FIG. 1 may be embodied as a CVI Corporation part number CLPG 20.

Figure 5:
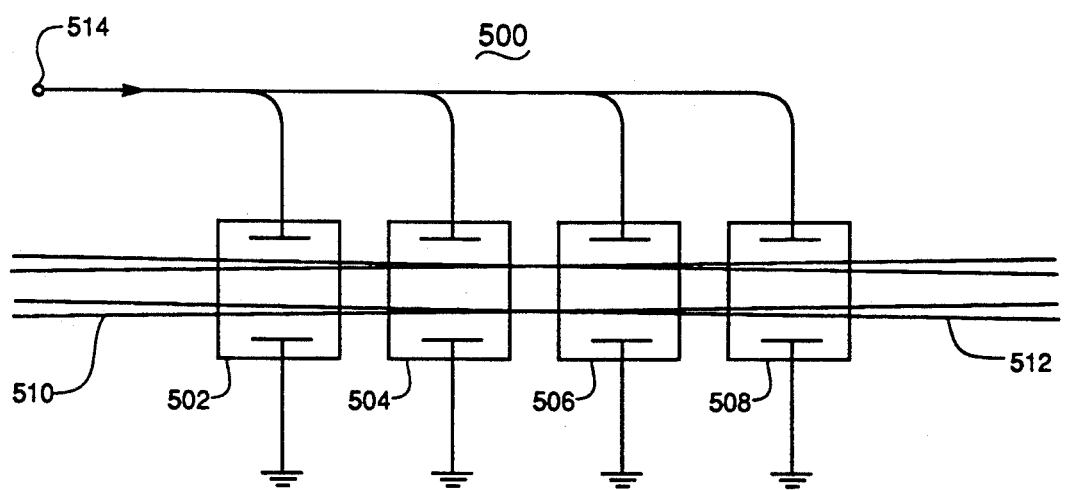
FIG. 5 shows an element arrangement for achieving the optical signal modulation employed in the FIG. 1 system.

An example of the electro-optical polarization modulating element 128 in FIG. 1 is comprised of the plurality of individual electro-optic crystals shown at 500 in FIG. 5 of the drawings. As indicated in FIG. 5, this array preferably consists of a plurality of individual electro-optic crystals, indicated by the crystals 502, 504, 506, and 508 with these crystal being disposed in an optical series and electrical parallel array configuration in order to distribute the polarization retardation angle and thereby reduce the required driver voltage, the signal applied at the node 514 in FIG. 5. Each of the crystals 502 and so on in FIG. 5 may consist of a commercially available large aperture Pockels cell which employs a crystal of, for example, potassium di-hydrogen phosphate (KD*P) as is available from Cleveland Crystal Company as their model TX2650, for example. In order to rotate the angle of polarization of light received along the path 512 in FIG. 5, that is, light received from the mirror 118 of FIG. 1, through an angle of ninety degrees, requires an electrical control signal of about twenty four hundred volts be applied to a single pockels cell crystal. With the four cell arrangement shown in FIG. 5, however, signals in the range of 600 volts are acceptable and are more convenient for generation in the signal generator circuit 108.

The rotated polarization output light beam of the array of crystals 500 in FIG. 5 is indicated at 510; this beam corresponding to the optical signals along the path 135 in FIG. 1. Polarization rotation in the crystals 502, 504, 506, and 508 is accomplished, for example, by way of the electro-optic Kerr or Pockels effects. These effects involve fast time proportioned rotation of the plane of polarization in the individual cells, such effects being well known in the electro-optic art. The light signal emerging from the FIG. 5 crystal array, the signal along the path 135 is analyzed as to polarization in order to segregate nearer and more distal portion of the image received from the target 100. This analysis results in intensity coding within the video camera apparatus of FIG. 1.

According to the preferred operation of the FIG. 1 system therefore, a pulse of laser sourced light is projected toward the distal target 100 and some of the light scattered by the target returns along the path 120 to ultimately arrive at the camera 102. The portions of this light returning from the near regions of the target 100 return earlier in time than the portions returning from the more distant regions. By way of the modulated polarization in the electro-optic crystal array 128, a time dependent ramp is imposed on the optical signal of one of the two frames of optical information received at the video camera 102. With this ramp, the time of arrival of the returning light and therefore the range of the target portion providing the return of this light can be recorded in the form of pixel intensity variations at the video camera 102.

Figure 2A:
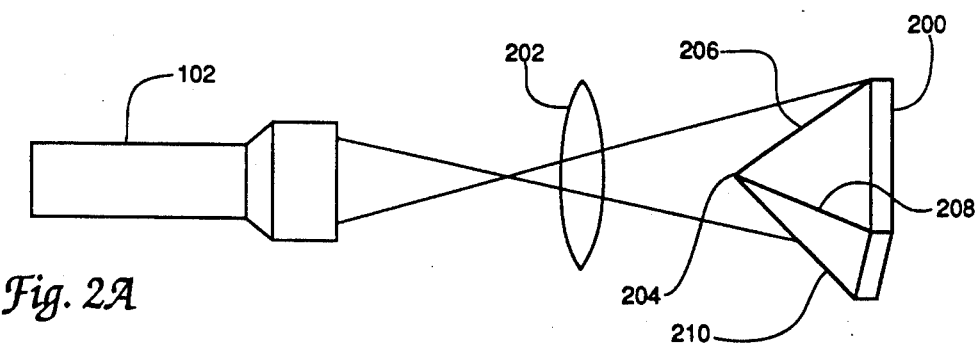
FIGS. 2A–2C show the concept of image pixel intensity modulated storage used in the FIG. 1 system.
Figure 2B:
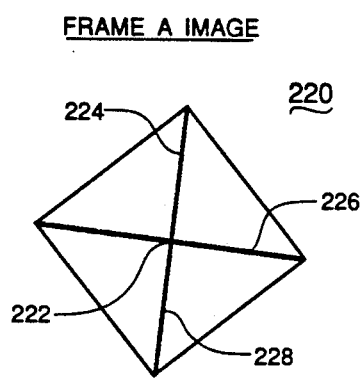
Figure 2C:
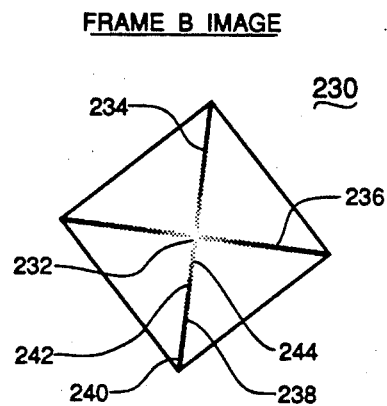

FIGS. 2A, 2B and 2C in the drawings show in diagram form the nature of the camera images accomplished in each of the two camera frames described herein. In FIG. 2A the camera 102 is shown and the optical system of FIG. 1 is replaced with a simplified and exemplary lens member 202 while the distal target 100 is represented by the pyramid 200 that is disposed with its apex portion 204 located closest to the lens 202 and the camera 102. The edges of the pyramid 200 communicate between, the camera-closest and more distal portions thereof and are represented by the lines 206, 208, and 210 in FIG. 2A.

The camera image received during the frame A or first frame of the camera operating cycle is shown at 220 in FIG 2B and represents a conventional head on view of the pyramid 200. In this view the apex appears at 222 and the edge lines 206, 208, and 210 appear at 224, 226, and 228 (a non inverted upright image is presumed). In the frame B or second frame of the camera operating cycle the optical image is modulated by a time dependent waveform that is synchronized with the image reflected signal as appears at 230, in FIG. 2C. In the frame B image at 230 the most distal portions of the pyramid 200 appear exactly as in the frame A image at 220, however, the apex at 232 does not appear and is represented by the intersection of the dotted portions of the lines 234, 236, and 238. As also indicated by these lines, the transition between appearing and non appearing portions of the edge lines is gradual and occurs over a significant portion of their length. For the edge line 238, for example, the most distal portion at 240 appears in normal fashion, however, the intensity of the closer portion at 242 begins to decrease and finally is of very low intensity at 244 and 232. The graduation of pixel intensities along the line 238 is therefore a measure of distance or range of the line portions from the lens 202 and the camera 102 in the Frame B image at 230 in FIG. 2C.

It should be recognized that the FIG. 2C drawing at 230 shows the appearance of a target object which in real life has feature lines of constant intensity; a target of this type is most useful for describing the functions of the FIG. 1 system. In reality, however, a target of varying feature line intensities is to be expected; therefore the FIG. 1 optical modulation will tend to further modify these non constant feature line intensities according to their close or distal location with respect to the FIG. 1 apparatus. The elected polarity of the optical modulation, that is whether the closely positioned or the distally positioned portions of the target are to be decreased in intensity by the modulation will also affect the appearance of the images received at the cameras 102.

Figure 3:
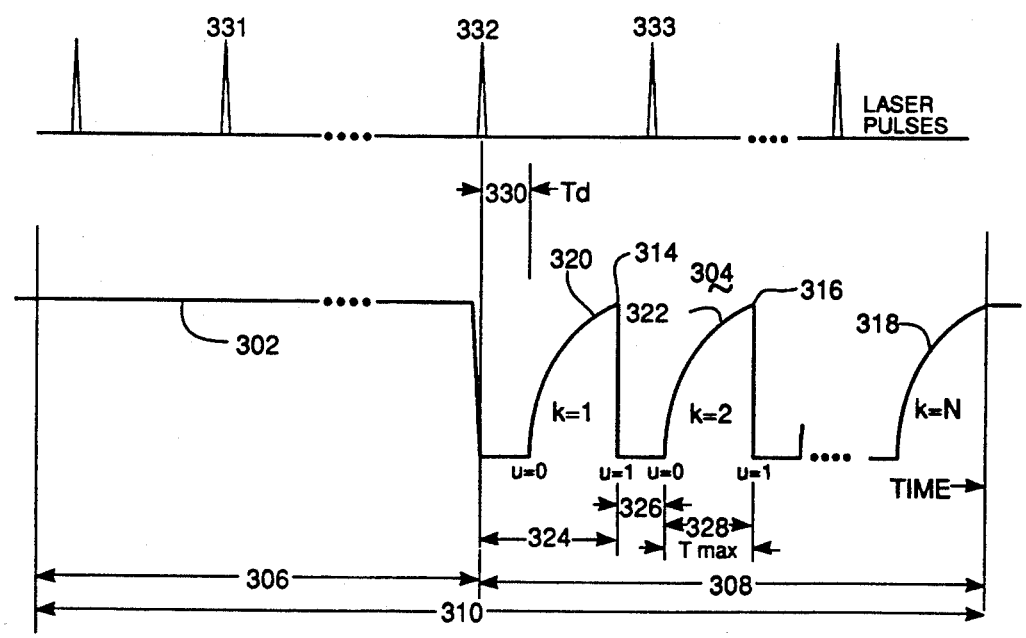
FIG. 3 shows a modulating waveform used with the FIG. 1 system.

The mathematical basis for the laser ranging and imaging system shown in FIG. 1 and the modulation waveform shown in FIG. 3 can be understood by considering that two light measurements are made over two subsequent camera frame times CA and CB within the basic acquisition cycle shown at 300 in FIG. 3. Frame CA as shown at 306 is characterized by having a constant modulation voltage level 302 so that all returning laser light through the Pockels cell is integrated by the camera over multiple laser pulses during this camera frame. Preferably the FIG. 1 camera 102 is of the charge coupled device, i.e. CCD, type and produces an image frame 306 every one thirtieth of a second. In the subsequent camera frame time 308 are located monotonically varying voltage signals 304 which modulate each returning light pulse as a function of the returning transit time. There is therefore an amplitude function for light reaching the camera which is equal to the product of a time dependent modulation and a scalar gain function:

$$M(t)*g(i,j) = \sin^2[hV(t)] * g(i,j), \quad (1)$$

where the polarization angle is proportional to the time varying voltage V(t) as is described in the text "Optics" by Hecht & Zajac which is published by Addison-Wesley Inc. 1975 and is hereby incorporated by reference herein. In equation 1 M(t) is the time dependent modulation factor for light intensity reaching camera 102 due to the electro-optical element 128 in FIG. 1.

V(t) is the voltage applied to the electro-optic element to induce time varying polarization to modulate the returning light signals.

h is a constant of proportionality.

g(i,j) is a differential gain array for the camera corresponding to each pixel in the camera image array.

The pixel indices specified by (i,j) allow for different scalar gain constants for each pixel of the target image. Ideally this gain is constant for all pixels and is mentioned only for the sake of clarity. Because the retardance of the linear polarization is proportional to the voltage applied across the longitudinal axis of the electro-optic element 128 in FIG. 1, the retardance angle relative to the first analyzing polarizer 126 is equal to h*V(t), where h is a constant of proportionality defined by h*Vmax=$\pi$/2 radians. The light reaching the camera 102 depends on the direction of the second analyzing polarizer 130 in FIG. 1. If the directions of the analyzing polarizers 130 and 126 are orthogonal, then the time varying modulation M(t) factor for light intensity is proportional to the square of the projecting amplitude factor sin(hv). The camera 102 integrates the light returned from multiple laser pulses occurring in one camera frame time. FIG. 3 depicts the modulating voltage signals over two frame times 306 and 308 of one camera cycle—the latter cycle of which enables the measurement CA. During the frame 306 measurement of Ca, the voltage signal V(t) is held constant at a value Vu, 312, corresponding to a retardance angle of 90 degrees. During the frame time 308 the voltage signal V(t) may be varied according to an exponential sawtooth waveform also shown in FIG. 3.

Additionally in FIG. 3:

k = Pulse number in a given camera cycle

N = Number of pulses or ramps per camera cycle

Td = Width of step or ramp in seconds; also 328 in FIG. 3 u = "Normalized Ramp" Time having values between zero and one, where a value of one corresponds to Tmax seconds M(u) = time dependent intensity modulation factor In order to simplify the following mathematical discussion, the time delay, Td, is assumed equal to zero. When the time delay, Td, is finite, range computations require the addition of a distance equal to (c*Td/2) to each input element, where c is the velocity of light.

With respect to the incoming radiation, for each camera image pixel there is a solid angle from which the pixel intercepts the incoming beam. The energy collected by the (i,j) pixel is specified by I(t,i,j). If there is no target surface element to reflect light back into the pixel denoted by the indices (i,j) then the function I(t,i,j) is zero throughout the camera cycle, Otherwise, the reflected light signal can be modeled by delta function pulses defined by $$I(t;i,j) = Ia(u,k;i,j)\delta(u - 2r(i,j)/c), \quad (2)$$

$$I(t;i,j) = Ib(u,k;i,j)\delta(u - 2r(i,j)/c), \quad (3)$$

where Ia(u,k;i,j) and Ib(u,k;i,j) are the intensities of the kth reflected signals in alternating pairs of camera cycles, r(i,j) is the distance of the surface element reflecting light to the (i,j) pixel, and c is the speed of light. The light Ca collected by the camera in one cycle is given by a sum of N pulses. For unmodulated cycles this is:

$$Ca(i,j) = g(i,j) \sum_{k=1}^{N} \int_0^1 Ia(u,k;i,j)du \quad (4)$$

and for alternate Cb camera cycles with voltage modulation this collected light Cb is:

$$Cb(i,j) = g(i,j) \sum_{k=1}^{N} \int_0^1 M(u)Ib(u,k;i,j)du \quad (5)$$

In the following discussion, the pixel indices are suppressed in the notation and the measured quantities pertain to each camera pixel. The delta function model presumes the emitted laser pulses are shorter than the duration of the voltage ramp pulse applied to the pockels cell array 128 in FIG. 1 and allows the following simplification $$Ca = g \sum_{k=1}^{N} Ia(k) \quad (6)$$

$$Cb = g \sin^2[h * V(2 r/c)] \sum_{k=1}^{N} Ib(k) \quad (7)$$

where I(k) indicates that the reflected energy in the different reflected pulses may vary, whereas the distance r is assumed to be constant over the camera cycle.

With respect to self normalized ratios, it is noted that the sums over Ia(k) and Ib(k) in equations 4 and 5 above are assumed to be approximately equal if physical conditions are sufficiently invariant over two camera cycles. Let $$Ib(k) = Ia(k)(1 + e(k)) \quad (8)$$

where E(k) represents any deviation per pulse from the assumption of equality. In this discussion, we pair individual measurements corresponding to the pulse number k to form N ratios:

$$Cb(k)/Ca(k) = (1 + e(k))*\sin^2[h*V(2r/c)] \quad (9)$$

where $Ca(k) = g*Ia(k)$ \quad (10)

$$Cb(k) = g*Ib(k)*\sin^2[h*V(2r/c)] \quad (11)$$

$R = \sin^2[h*V]$, the ideal of true intensity ratio \quad (12)

The ratio Cb(k)/Ca(k) is independent of the absolute intensity values when e(k) is very small: a condition referred to as self-normalization. If the random errors e(k) have zero mean, then the average error would tend to zero and the average ratio $<Cb/Ca>$ would approach the true ratio, R, with increasing N.

It is of interest to note that in the imaging and ranging system of the present invention the integration of pixel intensities received during multiple laser pulse illumination of the target image accomplishes a time averaging of the pixel pulses improving the signal-to-noise ratio, which also is based on mathematical approximation, referred to here as the pulse set approximation:

$$<Cb>/<Ca> = <Cb/Ca> \quad (13)$$

This approximation provides a basis for integrating N pulses per camera frame to compensate for a low reflected intensity obtained with a single pulse per camera frame. It also provides a basis for using the ratio of accumulated averages $<Ca>$ and $<Cb>$, which are two direct and electrically buffered measurements by the camera 102 in one acquisition cycle, to approximate the average of N paired ratios $<Cb/Ca>$ which cannot be directly computed.

$$<Ca> = \Sigma[Ca(k)]/N = Ca/N \quad (14)$$

$$<Cb> = \Sigma[Cb(k)]/N = Cb/N \quad (15)$$

e(k) is the error in the kth ratio.

$Cb(k) = <Cb>(1+s(k))$, where s(k) measures the deviation from the average $<Cb>$. \quad (16)

$$<e> = \Sigma[e(k)]/N \quad (17)$$

$$<s> = \Sigma[s(k)]/N = 0, \text{ by definition.} \quad (18)$$

Also it is defined that:

$$Cb/Ca = <Cb>/<Ca> = R(1 + <<e>>) \quad (19)$$

where $<<e>> = \Sigma[Ca(K)*e(k)]/\Sigma[Ca(k)]$. \quad (20)

Compare the above ratio with $$\Sigma[Cb(k)/Ca(k)] = N<Cb/Ca> = N * R[1 + <e>]. \quad (21)$$

Note that $<<e>> = <e> + <e*s>$, where
$<e*s> = \Sigma[e(k)*s(k)]/N$ \quad (22)

so that $$Cb/Ca - <Cb/Ca> = R(<<e>> - <e>) = R<e*s>. \quad (23)$$

For uncorrelated e(k) and s(k) and smaller random deviations, the difference factor $<e*s>$ is second order, thus allowing the approximation $Cb/Ca \longleftrightarrow <Cb/Ca>$. The pulse set approximation, together with the tendency of $<Cb/Ca> \longleftrightarrow R$ with increasing N, also allows the assumption that $Cb/Ca \longleftrightarrow R$ with increasing N.

With respect to range maps, having knowledge of V(t), or more specifically its inverse function, $t = W[V]$, allows one to solve for the unknown distance in terms of the ratio of camera measurements Cb/Ca, assuming self-normalization:

$$r = c*t/2 = c/2W[\sin^{-1}(S)/h], \quad (24)$$

where $S = (Cb/Ca)^{\frac{1}{2}}$ \quad (25)

Equations (24) and (25) therefore provide the basis for computation of range maps as is accomplished in the computer 106 in FIG. 1.

The pulse set approximation assumes S to equal the average of a function of the retardance angle i.e.

$$Cb/Ca = S^2 \longleftrightarrow <Cb(k)> \longleftrightarrow <\sin(h*V(t_k))> \longleftrightarrow R,$$

where $t_k$ the time of flight of the $K^{th}$ pair and R is the ideal intensity ratio.

It is also notable that the ranging system of the present invention operates without regard to the absolute values of pixel intensity observed in the system camera;

that is, as shown above the absolute values of intensities mathematically cancel and only the ratio of intensities appears in the output signal used to compute range in the system.

With respect to delay time and width of the proportioning voltage signal applied to the electro-optic element 128, the time delay Td and the ramp width Tmax may be software controlled by the computer portion of the digital image processor or hardware controlled by circuit elements in the driver signal generator circuit 108 in FIG. 1. The time separation interval, 326 in FIG. 3, would be large enough to accommodate a time delay and avoid overlapping return signals from different laser pulses such as pulses 332 and 333 in FIG. 3.

It is of interest to note that the depth of field for the present invention, i.e., the resolution, can be controlled electronically by way of adjusting the time delay and pulse duration of a signal voltage applied to the electro-optical modulation element 128 in FIG. 1. The time delay Td determines the minimum distance of the range field, (C Td)/2. Both Td and Tmax determine the maximum distance c(Td+Tmax)/2. The width of the range field equals (C*Tmax)/2. The delay time may be varied to optimize allocation of the range quantization and depth of field of the FIG. 1 system. The maximum resolution on a target surface occurs when the range field matches the radial depth of the viewed target surface. This means, for example, smaller Tmax for smaller target surface depths and larger Td for more distant targets.

Figure 4:
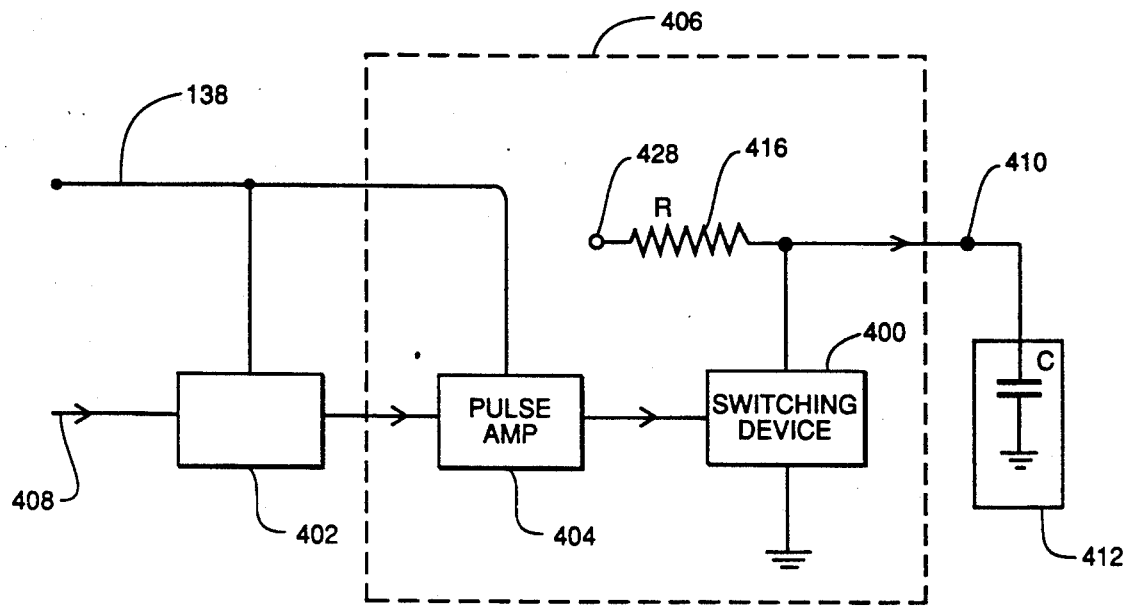
FIG. 4 shows elements of a modulation waveform generating circuit usable in the FIG. 1 system.

FIG. 4 in the drawings shows one circuit arrangement for the driver signal generator circuit 108 in FIG. 1. The FIG. 4 circuit includes a signal delay generator 402 and the high voltage signal generator 406. The signal delay generator 402 may be comprised of, for example, a Stanford Research System Inc. Model DG535 Pulse Generator or similar apparatus. The Stanford generator is manufactured by Stanford Research Systems Inc. of Palo Alto Calif.

The high voltage signal generator 406 is comprised of a capacitor charging source, the resistor 416 and the source of high voltage DC energy 428, together with the fast electronic controlled switch 400 and the pulse amplifier 404. The switch 400 may be comprised of a transistor such as the IRFPG 50 power field effect switching transistor manufactured by International Rectifier Corporation or other solid state device capable of operating at the five hundred volt or more signal levels described herein for the electro-optical polarization modulating element 128. Operation of a switching system of this type is disclosed in the article by R. J. Baker et al "Nanosecond Switching Using Power FET's" appearing in *Review of Scientific Instruments* volume 61, page 2211 (1990) which is hereby incorporated by reference herein.

The pulse amplifier 404 in FIG. 4 is controlled by the generator 402 and provides signals for the vacuum tube grid electrode or other input of the switching device 400. Depending upon the capabilities of the generator 402 and the requirements of the switching device 40 the amplifier may be embodied as a commercially fabricated amplifier, a multiple staged feedback amplifier, a single solid state or vacuum tube device or eliminated entirely. The latter possibility can be used when the switching device 400 has input requirements within the capability of the generator 402.

When the switching device 400 conducts, it shorts or dissipates or removes the charge build-up on the capacitance 412 of the electro-optical polarization modulating element 128. When the switching device 400 restores to the off condition the capacitance 412 again charges to the high voltage condition through the resistance 416. This charging and shorting under control of the generator 402 creates the waveform of the drawings.

The laser 104 in the FIG. 1 system produces synchronizing signals which communicate along the path 132 to the DPGC 108. These signals are received at 408 in the FIG. 4 circuit by way of a RS 232 port or the IEEE standard port that is available on the Stanford DG535 and similar apparatus.

The signal across the capacitance of the electro-optical polarization modulating element 128 in FIG. 1 is represented at The node 410 in FIG. 4 and controls the degree of polarization modulation achieved and thereby proportions the light signal on the path 127 into the camera 102 during the Cb modulated frame portion of a camera operating cycle.

In FIG. 3 a series of laser pulses 331, 332, and 333 are shown along with waveforms, switchable for operating the electro-optical modulating element 128 in FIG. 1. The pulses applied to the element 128 are identified with the symbols K=1, K=2, K=N in FIG. 3 and comprise the pulses of the modulated camera operating interval 308. The modulated interval 308 and the non modulated interval 306 together comprise the operating cycle 310 of the FIG. 1 apparatus.

In FIG. 3 waveforms, the pulse envelopes 318, 320, and 322 are determined as to waveshape or curvature by the relative sizes of the resistor 416, the voltage 428 and the capacitor 412 in FIG. 4. The desired characteristic of these waveforms is for them to be predictable and mathematically accommodatable during processing of the signals they produce in the camera 102.

During collection of the modulated optical signals at the camera 102 the signals on the path 134 control the electro-optical array thereby proportioning the returned light signals 137 between on and off states. The computer is programmed to allow the image processor board 105 to acquire an image if the scene to be ranged without the ramp modulation (i.e., the trigger pulses are gated off by signals output 132. This is called Frame A in the analysis. Then the computer allows pulse modulation to occur and it acquires a second image frame, Frame B. The range information is contained in the intensity of the recorded pixels (Picture elements in the image plane), in these two frames.

The present invention therefore provides a number of notable improvements into the imaging and ranging art. Among these improvements are:

1. An electronic scan with no moving parts.
2. Parallel optical scanning generates both optical images and range maps which are fully registered. This provides capability for optimal parallel processing.
3. The employed time of flight approach is accomplished with significantly lower electro-optical switching frequencies than used by conventional light detection and ranging systems.
4. The range map is achieved with a reflecting telescope.
5. Image amplification is achieved with a reflecting telescope.
6. The target illumination can use strong laser output.
7. The system achieves a new type of mono-axis ranging device using parallel time of flight measurement and facilitates repetitive accumulation of signals via phased locked laser pulsing cycles.

8. The projected laser beams can make use of structured encoding such as a spatial-temporal modulated beam or fringe arrays for increased information yield.

The present invention therefore solves the problem of obtaining a range image at high speed or real time for a scene presented to a camera based vision system. The described system captures two-dimensional images which contains the range information encoded into a ratio of registered pixel pairs. A numerical map of the range distributed in perfect registry with an optical image is therefore one of the possible output arrangement for the data collected by the present system.

While the apparatus and method herein described constitute a preferred embodiment of the invention, it is to be understood that the invention is not limited to this precise form of apparatus or method and that changes may be made therein without departing from the scope of the invention which is defined in the appended claims.

We claim:

1. The method for imaging and range mapping of a distal three-dimensional object comprising the steps of:
   illuminating the object with a sequence of single optical aperture sourced short duration laser energy optical pulses;
   collecting a first frame plurality of object reflected laser energy optical pulses via said aperture onto the retina of an optical to electrical energy transducer device;
   collecting a second frame plurality of object reflected laser energy optical pulses via said aperture onto the retina of said optical to electrical energy transducer device;
   imprinting a pattern of time dependent optical intensity modulation on the reflected energy pulses of said second frame prior to their retina collection, said modulation including a ramp waveform of predetermined monotonic mathematical character extending over the time interval of target range induced signal delay variation in said reflected pulses; and
   comparing the optical intensity determined electrical signals of said first and second frames on a corresponding image pixel basis to generate a sequence of range related pixel values.

2. The method of claim 1 wherein said comparing step includes computing the mathematical ratio of corresponding pixel first and second frame intensity related electrical signals.

3. The method of claim 1 wherein said time dependent intensity modulation is synchronized with the reflected laser optical pulse time following each laser energy optical pulse.

4. The method of claim 1 wherein said time dependent ramp waveform is exponential in nature.

5. The method of claim 1 wherein the ramp waveform modulates said object reflected laser energy optical pulses according to the magnitude of a squared trignometric function.

6. A single camera laser imaging and ranging system comprising the combination of:
   pulse operated laser means including a bidirectional single optical aperture member for illuminating a remotely disposed object;
   means including a single optical to electrical energy transducing camera member optically communicating with said object via said optical aperture for generating electrical signals representative of object image pixel optical signals;
   electrical signal controllable optical modulator means disposed in the optical path intermediate said aperture and camera members for intensity modulating the target generated optical signal received by said camera member;
   electrical signal waveform generator means for driving said optical modulator means into a first and second frame of pixels sequential cycle which includes first frame pixel passive optical transmission and time dependent optical intensity modulation of said second frame pixels;
   electrical means for recording and mathematically manipulating the pixel signals of said first and second frames into first and second frame pixel comparison based object range signals.

7. The imaging and ranging system of claim 6 wherein said signal waveform generator means includes means for generating a monotonic ramp function having time duration relating to the time of optical signal travel over the range distance interval of said system.

8. The imaging and ranging system of claim 6 wherein said optical modulator means includes optical polarization means.

9. The imaging and ranging system of claim 8 wherein said optical polarization means includes electro-optic cells taken from the group consisting of Pockels cells and Kerr cells.

10. The imaging and ranging system of claim 6 wherein said means for recording and manipulating includes means for computing the mathematical ratio of corresponding second frame and first frame pixel signals.

11. The imaging and ranging system of claim 6 wherein said waveform generator means includes means for generating a time dependent monotonic ramped sawtooth waveform.

12. The imaging and ranging system of claim 6 wherein said laser means also includes a plurality of optical reflector elements.

13. The imaging and ranging system of claim 12 wherein said optical to electrical energy transducing camera member includes a charge coupled device semiconductor array.

14. Laser imaging and ranging apparatus comprising the combination of:
   pulsed laser optical means including a single camera member and a first operating cycle portion therein for generating a full image first pixel intensity array representation of a distal target;
   first electrical memory means for storing said full image first representation in image pixel organized array;
   modulated optical path means including a second operating cycle portion in said camera member for generating a partial image second pixel intensity array representation of said target;
   said partial image second representation including a range proportioned pixel intensity modulation relationship with respect to a full image representation of said target;
   second electrical memory means for storing said partial image second representation in image pixel organization array; and
   mathematical algorithm electrical circuit means for computing the range coded intensity ratio of corresponding image pixels in said first and second electrical memory means.

15. The apparatus of claim 14 wherein said modulated optical path means range proportioned pixel intensity modulation relationship includes a mathematically described ramp function.

16. The apparatus of claim 14 wherein said modulated optical path means includes optical signal polarization means and an electrically controllable Pockels cell polarization rotation member.

17. The apparatus of claim 14 wherein said modulated optical path means includes optical signal polarization means and an electrically controllable Kerr cell polarization rotation member.

18. The apparatus of claim 14 wherein said camera member first and second operating cycle portions are sequentially disposed in time.

19. The apparatus of claim 14 wherein said mathematical algorithm electrical circuit means comprises a programmed digital computer.

* * * * *

UNITED STATES PATENT AND TRADEMARK OFFICE
CERTIFICATE OF CORRECTION

PATENT NO. : 5,162,861
DATED : November 10, 1992
INVENTOR(S) : Louis A. Tamburino et al It is certified that error appears in the above-identified patent and that said Letters Patent is hereby corrected as shown below:

Column 1, line 52, the comma should be deleted.

Column 6, line 17, "pockels" should be capitalized.
Column 6, line 61, the comma should be deleted.
Column 7, line 36, "cameras" should be --camera--.
Column 9, line 47, "of" should be --or--.
Column 10, line 51, "$sin^{=1}$" should be --$sin^{-1}$--.
Column 11, line 23, "(C*Tmax)/2" should be --(c*Tmax)/2--.
Column 11, line 60, "40" should be --400--.
Column 13, line 8, "contains" should be --contain--.

Signed and Sealed this

Twenty-first Day of December, 1993

Attest:

BRUCE LEHMAN

*Attesting Officer*   *Commissioner of Patents and Trademarks*